US010552952B2

(12) United States Patent
Lu et al.

(10) Patent No.: US 10,552,952 B2
(45) Date of Patent: Feb. 4, 2020

(54) GPU-BASED TFT-LCD MURA DEFECT DETECTION METHOD

(71) Applicant: WUHAN JINGCE ELECTRONIC GROUP CO., LTD., Hubei (CN)

(72) Inventors: Fangbo Lu, Hubei (CN); Feng Yao, Hubei (CN); Biaohua Deng, Hubei (CN); Kai Chen, Hubei (CN); Yafei Shen, Hubei (CN)

(73) Assignee: WUHAN JINGCE ELECTRONIC GROUP CO., LTD., Hubei (CN)

( * ) Notice: Subject to any disclaimer, the term of this patent is extended or adjusted under 35 U.S.C. 154(b) by 0 days.

(21) Appl. No.: 16/327,857

(22) PCT Filed: Sep. 7, 2016

(86) PCT No.: PCT/CN2016/098265
§ 371 (c)(1),
(2) Date: Feb. 25, 2019

(87) PCT Pub. No.: WO2018/040118
PCT Pub. Date: Mar. 8, 2018

(65) Prior Publication Data
US 2019/0197678 A1    Jun. 27, 2019

(30) Foreign Application Priority Data

Aug. 29, 2016 (CN) .......................... 2016 1 0761614

(51) Int. Cl.
*G09G 5/36* (2006.01)
*G06T 7/00* (2017.01)
(Continued)

(52) U.S. Cl.
CPC ............ *G06T 7/001* (2013.01); *G02F 1/1368* (2013.01); *G06T 1/20* (2013.01); *G06T 5/002* (2013.01);
(Continued)

(58) Field of Classification Search
CPC .......... G01N 2021/9513; G01N 21/956; G06T 2207/30121; G06T 7/0004;
(Continued)

(56) References Cited

FOREIGN PATENT DOCUMENTS

CN        103792699        5/2014
CN        103869511        6/2014
(Continued)

OTHER PUBLICATIONS

Fan et al. "Automatic detection of Mura defect in TFT-LCD based on regression diagnostics" From ScienceDirect, Pattern Recognition Letters, vol. 31, Issue 15, Nov. 1, 2010 https://www.sciencedirect.com/science/article/pii/S0167865510002369 (Year: 2010).*

(Continued)

*Primary Examiner* — Hau H Nguyen
(74) *Attorney, Agent, or Firm* — JCIPRNET

(57) ABSTRACT

The present disclosure discloses a GPU-based TFT-LCD Mura defect detection method, comprising: (1) establishing a studentized residual based double-second-order regression diagnosis model based original image data to obtain double-second-order regression background data; (2) obtaining influence quantities of respective data points on fitted values according to the original image data and the double-second-order regression background image data; (3) excluding outliers and influential points in the original image data according to the influence quantities to obtain a new pixel point set; (4) establishing a double-N-order polynomial surface fitting model according to the new pixel point set to obtain double-N-order background image data; (5) obtaining a residual image R according to the double-N-order background image data and the original image data, and performing threshold segmentation on the residual image to obtain a threshold segmentation image; and (6) performing morphological processing on the threshold segmentation (Continued)

image to obtain an eroded and dilated image, thereby achieving effective segmentation of Mura defects with uneven brightness distribution.

8 Claims, 3 Drawing Sheets

(51) Int. Cl.
| | |
|---|---|
| *G06T 7/136* | (2017.01) |
| *G06T 7/11* | (2017.01) |
| *G06T 7/155* | (2017.01) |
| *G02F 1/1368* | (2006.01) |
| *G06T 1/20* | (2006.01) |
| *G06T 5/00* | (2006.01) |
| *G06T 5/20* | (2006.01) |

(52) U.S. Cl.
CPC ............... *G06T 5/20* (2013.01); *G06T 7/11* (2017.01); *G06T 7/136* (2017.01); *G06T 7/155* (2017.01); *G06T 2207/20032* (2013.01); *G06T 2207/20036* (2013.01); *G06T 2207/30121* (2013.01)

(58) Field of Classification Search
CPC ... G09G 2320/0233; G09G 2320/0285; G09G 2320/043; G09G 2320/045; G09G 3/006; G09G 3/3225

See application file for complete search history.

(56) References Cited

FOREIGN PATENT DOCUMENTS

| | | |
|---|---|---|
| CN | 104408691 | 3/2015 |
| CN | 105158942 | 12/2015 |
| JP | 2005164565 | 6/2005 |

OTHER PUBLICATIONS

Chen et al. "TFT-LCD Mura defects automatic inspection system using linear regression diagnostic model" Institution of Mechanical Engineer, Nov. 2008 https://journals.sagepub.com/doi/abs/10.1243/09544054JEM1067 (Year: 2008).*

Bi et al., "Machine Vision Inspection Method of Mura Defect for TFT-LCD", Journal of Mechanical Engineering, Jun. 2010, pp. 13-19.

"International Search Report (Form PCT/ISA/210)", dated Apr. 27, 2017, with English translation thereof, pp. 1-5.

* cited by examiner

GPU-BASED TFT-LCD MURA DEFECT DETECTION METHOD

CROSS-REFERENCE TO RELATED APPLICATION

This application is a 371 application of an international PCT application serial no. PCT/CN2016/098265, filed on Sep. 7, 2016, which claims the priority benefits of China Application No. 201610761614.0, filed on Aug. 29, 2016. The entirety of each of the above-mentioned patent applications is hereby incorporated by reference herein and made a part of this specification.

BACKGROUND

Technical Field

The disclosure belongs to the field of display defect detection technology of liquid crystal displays, and more particularly relates to a GPU-based TFT-LCD Mura defect detection method.

Description of the Related Art

TFT-LCD (Thin Film Transistor Liquid Crystal Display) has become the most mainstream display device due to its characteristics of low power consumption, large size, high definition and the like, and is widely used in display fields such as LCD TVs and mobile terminals. Especially in a high-end display field such as HD and 3D, TFT-LCD has an absolute advantage.

The wide application of TFT-LCD and the consumers' increasing demand for high-performance display devices make the manufacturing technology and process of TFT-LCD more and more complicated, and in the process of manufacturing large quantities of TFT-LCD, certain bad products are inevitably generated. According to the defect morphology and background contrast, display defects of TFT-LCD are mainly divided into: point defect, line defect and Mura defect. The Mura defect features low contrast and uneven background brightness, and is easily interfered by background texture and complex noise, making the detection and repair of the Mura defects an important basis for enterprise competitiveness.

At present, the detection of Mura defects by major TFT-LCD panel manufacturers in the world mainly relies on naked-eye judgment of experienced testers, which features high cost, instability, low efficiency and the like. Machine vision defect detection is a non-contact detection method, and is widely used due to its characteristics of high degree of automation, good robustness and the like. However, in a defect image acquired by a CCD camera and the like, the Mura defect unevenness itself is blended with image background brightness unevenness due to uneven material of TFT-LCD, field of view deviation, uneven external light source and the like, resulting in that the automatic optical detection method cannot accurately detect the Mura defects, and is even worse than the manual detection method.

A main problem in the prior art is that the automatic optical detection method has poor self-adaptation, and high false detection rate and missing detection rate. For example, for different types of products and the same type of products with certain differences, the automatic optical detection method has poor self-adaptation and poor device debugging and operability. In addition, the current automatic optical detection method mainly adopts an inline detection mode, and in the prior art, a development environment such as a CPU is adopted, so that the detection time is long, and especially in a case of simultaneous detection of large-format and multiple images, the process efficiency is greatly affected.

Chinese Patent No. 201310405884.4, entitled "TFT-LCD Mura Defect Machine Vision Detection Method based on B-spline Surface Fitting", discloses a method in which B-spline surface fitting is performed on original image data and then the background image is subtracted from the original image. This method has a poor detection effect on Mura defects with a large uneven brightness area or large noise, and large calculation amount, and thus cannot meet the requirements of practical applications.

SUMMARY

In view of the above-described defects in the art, the present disclosure aims to provide a GPU-based TFT-LCD Mura defect detection method, so as to solve the technical problem that the methods in the prior art have a poor detection effect on Mura defects with a large uneven brightness area or large noise, low detection precision and large calculation amount.

The present disclosure provides a GPU-based TFT-LCD Mura defect detection method, comprising:

(1) establishing a studentized residual based double-second-order regression diagnosis model based original image data, calculating first coefficients of the double-second-order regression diagnosis model, and fitting the first coefficients to obtain double-second-order regression background data;

(2) obtaining influence quantities WK of respective data points on fitted values according to the original image data and the double-second-order regression background image data, wherein an influence quantity of an ith data point $(z_i, x_i^T)$ on the fitted values is $$WK_i = \frac{z_i - \overline{z1}(i)}{\hat{\sigma}(i)\sqrt{p_{ii}}} = \sqrt{\frac{(\hat{\beta}(i) - \hat{\beta})^T X^T X (\hat{\beta}(i) - \hat{\beta})}{\hat{\sigma}^2(i)}} \; ;$$

the larger the $WK_i$, the greater the influence of the ith data point on the surface fitting, and conversely, the smaller the $WK_i$, the smaller the influence of the ith data point on the surface fitting.

(3) excluding outliers and influential points in the original image data according to the influence quantities WK to obtain a new pixel point set $\Phi_B$;

(4) establishing a double-N-order polynomial surface fitting model according to the new pixel point set $\Phi_B$, calculating second coefficients of the double-N-order polynomial surface fitting model, and estimating double-N-order background image data according to the second coefficients;

(5) obtaining a residual image $R = Z - \overline{Z} + \tau$ according to the double-N-order background image data and the original image data, and performing threshold segmentation on the residual image to obtain a threshold segmentation image;

(6) performing morphological processing on the threshold segmentation image to obtain an eroded and dilated image.

Further, the step (1) specifically comprises:

(1.1) establishing a studentized residual based double-second-order regression diagnosis model $Z = X\beta + \varepsilon = p_{00} + p_{10}x + p_{01}y + p_{20}x^2 + p_{11}xy + p_{02}y^2 + \varepsilon$;

(1.2) calculating estimation values $\hat{\beta}=(X^T X)^{-1} X^T Z$ of the first coefficients of the double-second-order regression diagnosis model by using a least square method;

(1.3) fitting the estimation values of the first coefficients to obtain a double-second-order regression background image data $\widehat{Z1} = X\hat{\beta} = X(X^T X)^{-1} X^T$, wherein X represents a matrix representation of a horizontal and a vertical axis coordinates of a two-dimensional image; Z represents a pixel gray value at a corresponding coordinate position in X; $p_{00}, p_{01}, \ldots, p_{20}$ represent the first coefficients of the double-second-order regression diagnosis model; ε represents a residual value, which satisfies $\varepsilon \sim (0, \sigma^2 I)$; β represents a vector representation of the first coefficients, and a confidence region of β at a level of 1−α is expressed as: $(\hat{\beta}-\beta) X^T X (\hat{\beta}-\beta) \leq p\hat{\sigma}^2 F(p, n-p, 1-\alpha)$, where p represents a number of coefficients of the double-second-order regression diagnosis model; n represents a total number of image pixel points; $\hat{\beta}$ and $\hat{\sigma}$ respectively represent least square estimations of the first coefficients β and a variance α; and F(p, n−p) represents an F distribution.

Further, the TFT-LCD Mura defect detection method further comprises, before the step (1.1), the step of: performing Gabor filtering on the original image data to remove a moiré and a texture grid in an original image captured by a charge coupled device (CCD), wherein the Gabor filtering operator includes:

$$g(x, y, f, \theta) = \frac{1}{ab} \exp\left[-\pi\left(\frac{x_r^2}{a^2} + \frac{y_r^2}{b^2}\right)\right]\left[\exp(i2\pi f x_r) - \exp\left(-\frac{\pi^2}{2}\right)\right];$$

$$x_r = x \cos\theta + y \sin\theta, \quad y_r = -x \sin\theta + y \cos\theta,$$

f represents a filtering frequency, and θ represents a filter direction; f is ½T, where T represents a width of a texture unit.

Further, the filter directions θ are 0°, 45°, 90° and 135°, respectively. More filter directions can bring about enhanced filtering effect, but the calculation amount may be greatly increased, and thus, in general texture analysis, four filter directions are sufficient. In the image subjected to Gabor filtering in the present disclosure, the texture grid is basically suppressed.

Further, the step (3) specifically comprises:

(3.1) ranking the influence quantities WK from small to large, taking points whose WK rank top γ % as outlier regions, setting pixel values of the points to 1 and setting pixel values of other points to 0, thereby obtaining a binarized image $\Phi_{uv}$;

(3.2) performing median filtering on the binarized image $\Phi_{uv}$ to obtain a filtered outlier image $\Phi f$;

(3.3) ranking residual images E from large to small, taking points whose values rank top ω % as influential point regions, setting pixel values of the points to 1 and setting pixel values of other points to 0, thereby obtaining an influential point image $\Phi g$; and (3.4) excluding the influential point image $\Phi g$ and the outlier image $\Phi f$ from an original image pixel point set Φ to obtain a new pixel point set $\Phi_B$, wherein $$\Phi_{uv} = \begin{cases} 1, & WK_i < \gamma \% \\ 0, & WK_i \geq \gamma \% \end{cases},$$

and γ represents an outlier threshold, which has a value range of 0 to 100; the residual image is $E = |z - \widehat{Z1}|$, z and $\widehat{Z1}$ have the same meanings as above, and ω is 2 to 10; $\Phi_B = \Phi - \Phi g - \Phi.*\Phi f$, where .* represents a dot product operation, and $\Phi_B$ represents a pixel point set obtained by excluding the influential points and the outliers from the original image pixel point set Φ; the outlier refers to a point that is far away from overall data points and unable to be well explained by an established regression model; the influential point refers to a point which greatly changes the regression model.

Further, since the brightness change trend of the overall image can be approximately estimated by the polynomial fitting, and the success or failure of the fitting depends largely on the selection of the polynomial order. If the polynomial order is too low, the fitting effect is poor, and an obvious block effect may occur. If the polynomial order is too high, on the one hand, the time consumed increases geometrically, and on the other hand, an over-fitting phenomenon may easily occur. Considering various factors comprehensively, it is preferable that N is 4 or 5; if N is 4, the step (4) specifically comprises:

(4.1) establishing a double-fourth-order polynomial surface fitting model $Z = X\beta + \varepsilon = p_{00} + p_{10}x + p_{01}y + p_{20}x^2 + p_{11}xy + p_{02}y^2 + p_{30}x^3 + p_{21}x^2y + p_{12}xy^2 + p_{03}y^3 + p_{40}x^4 + p_{31}x^3y + p_{22}x^2y^2 + p_{13}xy^3 + p_{04}y^4 + \varepsilon$;

(4.2) calculating estimation values $\hat{\beta} = (X^T X)^{-1} X^T Z$ of second coefficients of the double-fourth-order polynomial surface fitting model by using the least-squares method; and (4.3) fitting the estimation values of the second coefficients to obtain a double-four-order background image data $\overline{Z} = X\hat{\beta} = \hat{p}_{00} + \hat{p}_{10}x + \hat{p}_{01}y + \hat{p}_{20}x^2 + \hat{p}_{11}xy + \hat{p}_{02}y^2 + \hat{p}_{30}x^3 + \hat{p}_{21}x^2y + \hat{p}_{12}xy^2 + \hat{p}_{03}y^3 + \hat{p}_{40}x^4 + \hat{p}_{31}x^3y + \hat{p}_{22}x^2y^2 + \hat{p}_{13}xy^3 + \hat{p}_{04}y^4$, wherein X and Z respectively represents a coordinate data set and a gray data set corresponding to the new pixel point set $\Phi_B$ in which the outliers and the influential points are excluded, $p_{00}, p_{01}, \ldots, p_{40}$ represent the coefficients of the double-fourth-order polynomial surface fitting model, and $\overline{Z}$ represents a background image finally fitted from the original image.

Further, in the step (5), the threshold segmentation specifically comprises:

performing pixel dot product of the residual image R and an inversed binarized image to obtain a residual $RES = (1 - \Phi f).*R$, in which the outlier regions are excluded; and obtaining a threshold segmentation image T(u, v) according to the residual RES as well as an average value $u_\Phi$ and a variance $\sigma_\Phi$ of a background region, wherein the threshold segmentation image is $$T(u, v) = \begin{cases} 1, & |RES(u, v) - u_\Phi|/\sigma_\Phi > Thresh \\ 0, & |RES(u, v) - u_\Phi|/\sigma_\Phi \leq Thresh \end{cases},$$

the average value of the background region is $$u_\Phi = \frac{\sum RES}{\sum (1 - \Phi f)},$$

the variance of the background region is $$\sigma_\Phi = \frac{\sum (RES - u_\Phi)^2}{\sum (1 - \Phi f)},$$

and the threshold value Thresh has a value range of 0.6 to 3.

Further, in the step (6), the morphological processing specifically comprises: performing an erosion operation to remove small connected regions in the threshold segmentation image, and then performing a dilation operation on the image subjected to the erosion operation to connect adjacent target regions, so as to obtain an eroded and dilated image.

Further, the steps (1)-(6) are all implemented based on parallel processing of a graphics processing unit, the parallel processing comprising: allocating GPU memory and threads, binding CUDA arrays stored in the GPU memory to CUDA texture memory, allocating shared memories, starting kernel and performing GPU coarse-grained and fine-grained collaborative parallel computing to implement the steps (1)-(6), and passing calculating results back to the CPU from the GPU.

Coarse-grained and fine-grained algorithm acceleration is achieved by GPU parallel processing in the steps (1)-(6), in which the so-called "fine-grained" refers to that data parallelism is developed with minimum grain at each stage of the algorithm; the so-called "coarse-grained" refers to that data sharing is performed in units of thread blocks at each stage of the algorithm. In the GPU, a two-dimensional thread grid is constituted by two-dimensional thread blocks, and each two-dimensional thread block is constituted by a plurality of threads, in which the ith pixel in the iterative data is calculated by the ith thread in the thread grid, and parallel processing is performed between respective blocks which cannot communicate with each other, ensuring the independence and stability between the data blocks. Meanwhile, threads in the same thread block exchange data through a shared memory, and through barrier synchronization, correct data sharing between the threads is ensured In general, by comparing the above technical solution of the present inventive concept with the prior art, the present disclosure has the following beneficial effects:

(1) In the present disclosure, the regression diagnosis idea and the surface fitting method are effectively combined, in which the outlier regions and the influential point regions are excluded in the surface fitting to avoid the interference of the outliers and the influential points which allow the regression curve to move toward the outliers, thereby improving the accuracy of the background fitting. Therefore, the method of the present disclosure has a good detection effect on Mura defects with a large uneven brightness area or large noise.

(2) In the present disclosure, low-order regression diagnosis and high-order polynomial fitting are combined to perform background estimation, in which the low-order regression diagnosis belongs to rough fitting, which is convenient for searching outliers in the original image, and the high-order polynomial fitting belongs to fine fitting, which is a correction and supplement to the low-order fitting. Through effectively combining the rough fitting with the fine fitting, the defect of poor fitting precision caused by separate use of the two fittings can be avoided.

(3) in the present disclosure, a graphics processing unit (GPU) is effectively utilized to perform parallel acceleration, which can greatly reduce the processing time of the method. In addition, shared memories and texture memories are used to further reduce the GPU memory access time to realize high-speed and low-delay communication between threads, thereby greatly improving the efficiency of the detection process (4) The method of the present disclosure has strong versatility, and can be applied to the detection of Mura defects with various morphologies on currently available liquid crystal displays of various specifications.

DETAILED DESCRIPTION OF THE EMBODIMENTS

Figure 1:
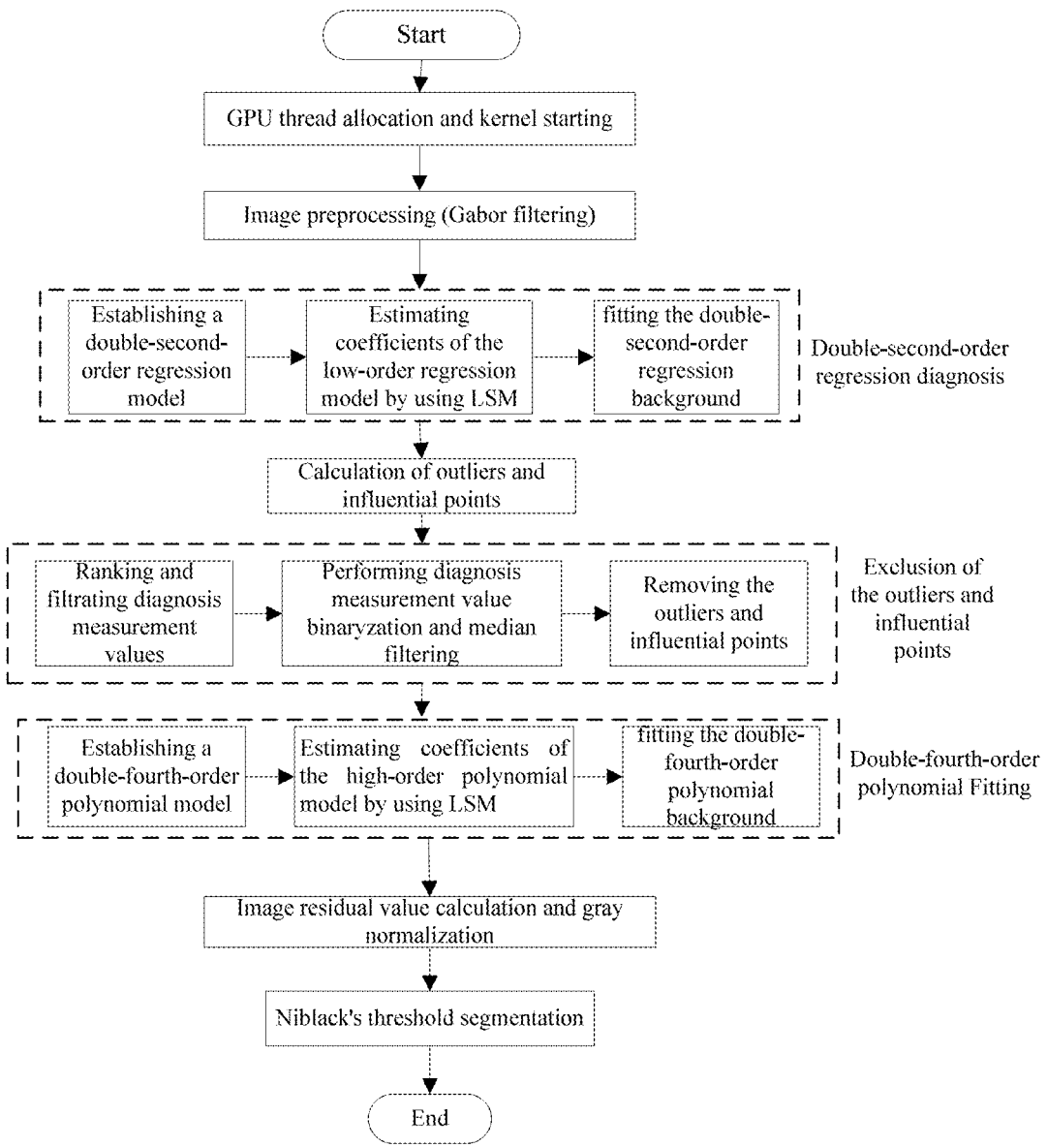
FIG. 1 is a flow chart of a TFT-LCD Mura defect detection method based on regression diagnosis and polynomial surface fitting according to the present disclosure.

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

The disclosure belongs to the field of display defect detection technology of liquid crystal displays, and more particularly relates to a method for detecting Mura defects on a TFT-LCD by using machine vision, and the method proposed in the present disclosure has high detection efficiency and high detection accuracy. Meanwhile, with enhanced versatility and improved performance, the graphics processing unit (GPU) shows great potential when used as a general-purpose parallel processing unit, which is more and more obvious in fields of machine vision, graphics processing and the like. A lot of parallel processing is involved in the regression diagnostic and surface fitting methods, which provides the possibility for parallel implementation on the GPU. Therefore, the present disclosure is directed to utilizing the powerful parallel computing power of the GPU to achieve optimization and acceleration of the regression diagnosis method and the surface fitting method.

The present disclosure discloses a high-precision, high-speed and high-stability Mura defect automatic optical detection method. In this method, a studentized residual based low-order regression diagnosis model is firstly established to predict and analyze outliers and influential points in the TFT-LCD image according to the Welsch's distance; binarization and median filtering are performed to exclude outlier regions and influential point regions from the original image; high-order surface fitting is performed on the image in which the outlier regions and influential point regions are excluded, thereby fitting a background image, which is then used as an effective background region of the original image; the estimated background image is subtracted from the original image to obtain a residual image with uniform background, thereby effectively solving the problem of uneven brightness distribution. On this basis, various Mura defects can be segmented from the residual image by the Niblack's threshold segmentation method.

For the existing B-spline, polynomial and other surface fitting methods, it is necessary to perform control point inversion and forward fitting on a large amount of data at each time, resulting in a slow fitting speed. Embodiments of the present disclosure provide a background fitting method based on GPU acceleration, which reasonably utilizes GPU coarse-grained and fine-grained parallel collaborative processing. In addition, high-speed and low-delay communication between threads can be achieved by shared memories of the GPU, and texture memories of the GPU have a good acceleration effect on random access of large data. Thus, the GPU memory access time can be further reduced by the shared memories and texture memories, thereby greatly improving the processing efficiency of the method.

The present disclosure provides a GPU-based TFT-LCD Mura defect detection method, comprising:

(1) Image preprocessing: filtering the original image to remove the influence of moiré and texture grid. The filtering method includes, but is not limited to, Gabor filtering, Fourier transform or the like.

(2) Establishing a double-second-order regression diagnosis model, calculating coefficients of the double-second-order regression diagnosis model, and fitting the coefficients of the double-second-order regression diagnosis model to obtain a regression surface which approximately reflects a basic change trend of the image background.

(3) Calculating and excluding outliers and influential points, which specifically comprising the following steps: ① calculating diagnostic measurement values, ranking all the diagnostic measurement values from small to large, taking out pixels whose values rank top $\gamma$ %, setting pixel values of the pixels to 1 and setting pixel values of other pixels to 0; ② performing median filtering on the binarized image in the step ①, in which a filtered region where the pixel value is 1 is an outlier region; ③ ranking absolute values of the residual images from large to small, and taking points whose values rank top $\omega$ % as influential point regions; ④ excluding the outlier regions and the influential point regions from the double-second-order regression diagnosis model.

(4) Establishing a fourth-order polynomial model, calculating coefficients of the fourth-order polynomial model, and estimating a background model.

(5) Subtracting the fourth-order background model from the original image to obtain a residual image with uniform background brightness, and normalizing the residual image.

(6) Niblack's threshold segmentation. The threshold segmentation method includes, but is not limited to, the Niblack's threshold segmentation.

In the embodiments of the present disclosure, the steps (1)-(6) are all implemented based on parallel processing of a graphics processing unit (GPU). The GPU collaborative parallel computing mainly includes: allocating GPU memory and threads, binding CUDA (Compute Unified Device Architecture) arrays stored in the GPU memory to CUDA texture memory, allocating shared memories, starting kernel and performing GPU coarse-grained and fine-grained collaborative parallel computing, and passing calculating results back to the CPU from the GPU.

GPU is far superior in speed and bandwidth to the current mainstream CPU processor due to its high-speed floating-point parallel computing power, and can achieve tens of times higher computational efficiency than CPU in vector computing. A lot of parallel operations are involved in computer vision image processing, and very suitable for GPU parallel processing. Therefore, the present disclosure utilizes the graphics processing unit (GPU) to perform parallel algorithm acceleration, which can greatly reduce the processing time of the algorithm, and thus improving the efficiency of the detection process.

According to an embodiment of the present invention, the step (6) further includes mathematical morphology processing, which is mainly to remove noise or small interference blocks in the image subjected to threshold segmentation, so that defect parts are completely presented without causing over-detection.

The present disclosure provides a simple and efficient TFT-LCD Mura defect detection method, which has advantages of high detection precision and fast detection speed, and can overcome shortcomings such as instability and low efficiency in the manual defect detection, as well as shortcomings such as large fitting deviation and low speed in the traditional B-spline surface fitting, polynomial surface fitting and the like. Specific description is given below:

(1) The method of the present disclosure has strong versatility, and can be applied to the detection of Mura defects with various morphologies on currently available liquid crystal displays of various specifications.

(2) In the present disclosure, the regression diagnosis idea and the surface fitting method are effectively combined, in which the outlier regions and the influential point regions are excluded in the surface fitting to avoid the interference of the outliers and the influential points which allow the regression curve to move toward the outliers, thereby improving the accuracy of the background fitting. Therefore, the method of the present disclosure has a good detection effect on Mura defects with a large uneven brightness area or large noise.

(3) In the present disclosure, low-order regression diagnosis and high-order polynomial fitting are combined to perform background estimation, in which the low-order regression diagnosis belongs to rough fitting, which is convenient for searching outliers in the original image, and the high-order polynomial fitting belongs to fine fitting, which is a correction and supplement to the low-order fitting. Through effectively combining the rough fitting with the fine fitting, the defect of poor fitting precision caused by separate use of the two fittings can be avoided.

(4) In the present disclosure, a graphics processing unit (GPU) is effectively utilized to perform parallel algorithm acceleration, which can greatly reduce the processing time of the algorithm. In addition, shared memories and texture memories are used to further reduce the GPU memory access time to realize high-speed and low-delay communication between threads, thereby greatly improving the efficiency of the detection process.

Figure 3:
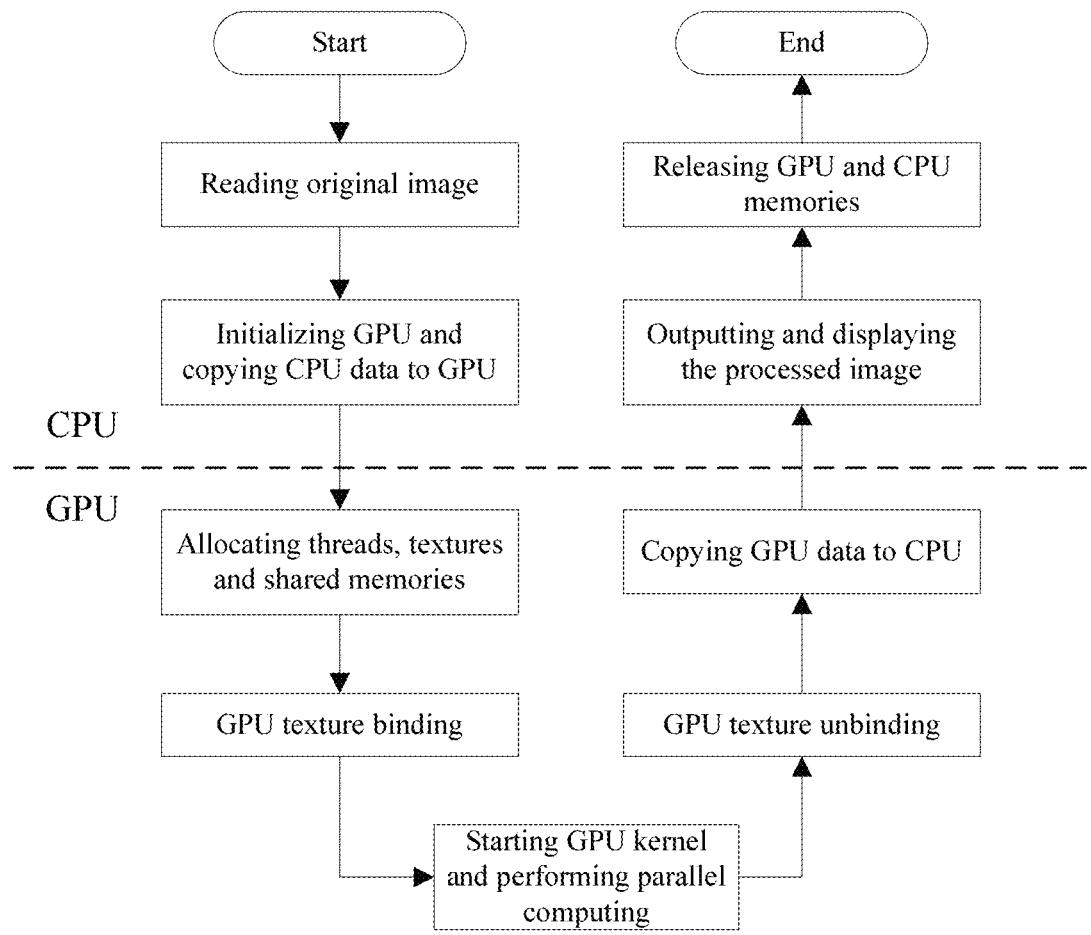
FIG. 3 is a flow chart showing parallel processing of GPU.

In order to further illustrate the GPU-based TFT-LCD Mura defect detection method according to the embodiments of the present disclosure, a detailed description is given below with reference to the drawings: FIG. 1 shows a flow chart of a GPU-based TFT-LCD Mura defect detection method according to embodiments of the present disclosure, the method comprising:

Step S101: allocating GPU memory space and performing initialization according to the size of a target image; copying the original image data from the CPU to the GPU memory, binding CUDA arrays in the GPU memory to texture memory, and reasonably allocating threads and shared memories, each pixel corresponding to one thread; and stating the kernel and performing GPU coarse-grained and fine-grained collaborative parallel computing, the GPU parallel computing being shown in FIG. 3.

Step S102: performing image preprocessing, i.e., performing Gabor filtering on the original image to remove moiré (the moiré refers to a high frequency fringe phenomenon appearing on an image captured by a device such as a digital camera whose photosensitive element is subjected to high frequency interference) and texture grid in the original image captured by CCD (the texture grid refers to a regularly arranged repeating texture background resulting from horizontal and vertical scan lines in the TFT substrate in camera image acquisition). The Gabor filtering is performed by using the GPU parallel convolution operation.

The Gabor filtering operator includes:

$$g(x, y, f, \theta) = \frac{1}{ab} \exp\left[-\pi\left(\frac{x_r^2}{a^2} + \frac{y_r^2}{b^2}\right)\right]\left[\exp(i2\pi f x_r) - \exp\left(-\frac{\pi^2}{2}\right)\right]$$

where $x_r = x \cos\theta + y \sin\theta$, $y_r = -x \sin\theta + y \cos\theta$, f represents a filtering frequency, and $\theta$ represents a filter direction. The filtering frequency f has a value range of $[1/16 T, 1/2 T]$, and in the present disclosure, f is selected to be $1/2 T$, where T represents a width of a texture unit. In the present disclosure, taking into account operation time and performance, four filter directions $\theta$ of $0°$, $45°$, $90°$ and $135°$ are selected. More filter directions can bring about enhanced filtering effect, but it may greatly increase the calculation amount, and thus, in general texture analysis, four filter directions are sufficient. Filtered images with different directions are fused to obtain a final filtered image, as shown in (a) of FIG. 2. In the image subjected to the Gabor filtering, the texture grid is basically suppressed.

Figure 2:
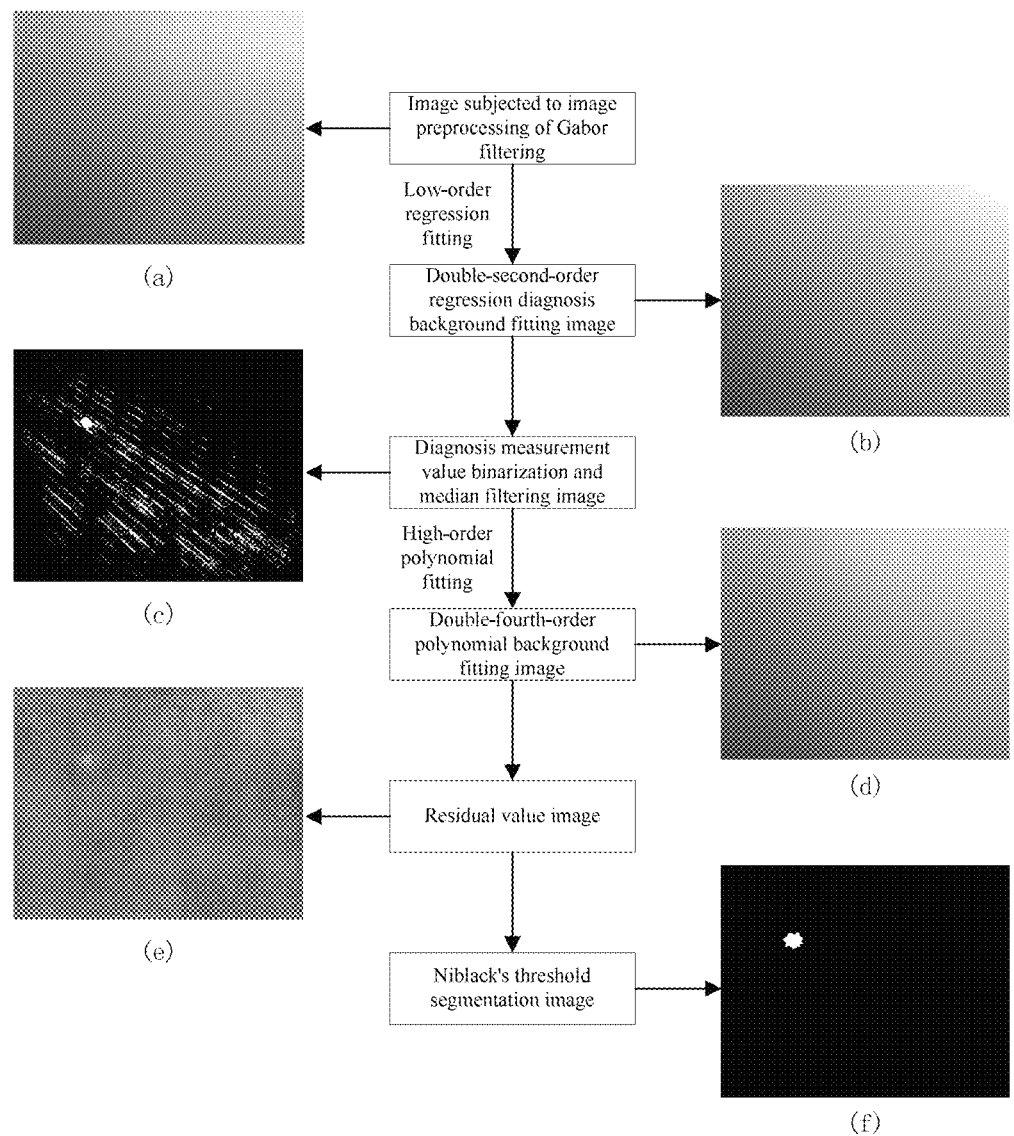
FIG. 2 is a schematic diagram showing the TFT-LCD Mura defect detection method based on regression diagnosis and polynomial surface fitting, in which (a) of FIG. 2 shows an image subjected to image preprocessing of Gabor filtering, (b) of FIG. 2 shows a background image fitted by double-second-order regression diagnosis, (c) of FIG. 2 shows an image obtained by performing diagnosis measurement value binarization and median filtering on the regression diagnosis image, (d) of FIG. 2 shows a background image obtained by double-fourth-order polynomial fitting, (e) of FIG. 2 shows a residual image obtained by subtracting the background image obtained by the double-fourth-order polynomial fitting from the original image, and it of FIG. 2 shows an image obtained by performing Niblack's algorithm threshold on the residual image.

Step S103: establishing a studentized residual based double-second-order regression diagnosis model, calculating coefficients of the double-second-order regression diagnosis model, and fitting the coefficients of the double-second-order regression diagnosis model to obtain a regression surface which approximately reflects a basic change trend of the image background, as shown in (b) of FIG. 2. The regression analysis model is a statistical model for studying the relationship between multiple variables, and through the regression analysis model, possible outliers and influential points can be detected in the TFT-LCD. Background information of an image can be approximately estimated by polynomial fitting, but in practical applications, the accuracy of the polynomial fitting is susceptible to interference from outliers and influential points in the original image, so that the polynomial fitting is deviated from the normal fitting direction. Therefore, it is necessary to exclude outliers and influential points based on the double-second-order regression diagnosis model before performing polynomial fitting, so as to improve the accuracy of the polynomial fitting.

(1) Establishing of a studentized residual based double-second-order regression diagnosis model The studentized residual based double-second-order regression diagnosis model may be expressed as:

$$Z = X\beta + \varepsilon = p_{00} + p_{10}x + p_{01}y + p_{20}x^2 + p_{11}xy + p_{02}y^2 + \varepsilon,$$

wherein X represents a matrix representation of horizontal and vertical axis coordinates of a two-dimensional image; Z represents a pixel gray value at a corresponding coordinate position in X; $p_{00}, p_{01}, \ldots, p_{20}$ represents first coefficients of the double-second-order regression diagnosis model; $\varepsilon$ represents a residual value, which satisfies $\varepsilon \sim (0, \sigma^2 I)$; $\beta$ represents a vector representation of the first coefficients, and a confidence region of $\beta$ at a level of $1-\alpha$ is expressed as:

$$(\hat{\beta}-\beta)X^T X(\hat{\beta}-\beta) \le p\hat{\sigma}^2 F(p, n-p, 1-\alpha),$$

where p represents the number of coefficients of the double-second-order regression diagnosis model; n represents the total number of image pixel points; $\hat{\beta}$ and $\hat{\sigma}$ respectively represent least square estimations of the coefficients $\beta$ and the variance $\sigma$; and $F(p, n-p)$ represents F distribution;

(2) Calculation of estimation values of coefficients of the double-second-order regression diagnosis model by using least square method (LSM). The estimation values of the coefficients in the least squares sense are: $\hat{\beta} = (X^T X)^{-1} X^T Z$;

(3) Double-second-order regression background image fitting. The double-second-order regression background image, obtained by fitting estimation values of the coefficients of the regression diagnosis model, is expressed as: $\widehat{Z1} = X\hat{\beta} = X(X^T X)^{-1} X^T$.

Step S104: regression diagnosis of outliers and influential points. The outliers refer to points that are far away from overall data points and unable to be well explained by an established regression model. In TFT-LCD, outliers may be Mura defects with uneven brightness or uneven color in the image, and the existence of the outliers may cause the estimated regression surface to move toward the outliers, which results in a large residual in the established regression model. The influential points refer to points which greatly change the regression model, often resulting in a very different analysis result. Therefore, the outliers and the influential points should be diagnosed and excluded in practice.

A data deletion model of the ith data points $(z_i, x_i^T)$ can be expressed as $Z(i) = X(i)\beta + \varepsilon(i)$, where $X(i)$ represents a data set obtained by removing $x_i^T$ in the ith line from a coordinate data set X, $Z(i)$ represents a data set obtained by removing $z_i$ in the ith line from a gray data set Z, $z_i$ represents a gray value of the ith data point, and $x_i^T$ represents a coordinate vector of the ith data point. Least square estimation values $\hat{\beta}$ and $\hat{\sigma}^2$ of $\beta$ and $\delta^2$ of the model $Z = X\beta + \varepsilon$ and corresponding estimation values $\hat{\beta}(i)$ and $\hat{\sigma}^2(i)$ in $Z(i) = X(i)\beta + \varepsilon(i)$ has the following relationship:

$$\hat{\beta}(i) = \hat{\beta} - \frac{(X^T X)^{-1} x_i \hat{e}_i}{1 - p_{ii}}, \quad \hat{\sigma}^2(i) = \frac{(n - p - r_i^2)}{n - p - 1}\hat{\sigma}^2$$

$$\hat{e}_i = z_i - \ddot{z}\hat{1}_i, \quad \hat{z}_i = x_i^T \hat{\beta}, \quad r_i = \frac{\hat{e}_i}{\hat{\sigma}\sqrt{1 - p_{ii}}}$$

where $p_{ii}$ represents a diagonal element of a projection matrix $P = X(X^T X)^{-1} X^T$ generated by X, $\hat{e}_i$ represents a residual value of the ith data point, $r_i$ represents a standardized residual, and other parameters are the same as above.

Then, the influence of the ith data point $(z_i, x_i^T)$ on fitted values is defined as:

$$WK_i = \frac{z_i - \widehat{z1}(i)}{\hat{\sigma}(i)\sqrt{p_{ii}}} = \sqrt{\frac{(\hat{\beta}(i) - \hat{\beta})^T X^T X (\hat{\beta}(i) - \hat{\beta})}{\hat{\sigma}^2(i)}},$$

where $WK_i$ represents the Welsch-Kuh distance, which is referred to as the WK statistic. The larger the $WK_i$, the greater the influence of the ith data point on the surface fitting. Conversely, the smaller the value of the $WK_i$, the smaller the influence of the ith data point on the surface fitting.

Step S105: exclusion of the outliers and influential points (1) Ranking WK from small to large, taking points whose values rank top γ % as outlier regions, setting pixel values of the points to 1 and setting pixel values of other points to 0, thereby obtaining a binarized image as below:

$$\Phi_{uv} = \begin{cases} 1, & WK_i < \gamma \% \\ 0, & WK_i \geq \gamma \% \end{cases},$$

where γ represents an outlier threshold, which has a value range of 0 to 100.

(2) Performing median filtering on the binarized image $\varphi_{uv}$ to filter out scattered points which are regarded as non-influential outliers. The obtained outlier image is expressed as Φf. An image obtained by diagnostic measurement value binarization and median filtering is shown in (c) of FIG. 2.

(3) Ranking absolute values of the residual images E from large to small, taking points whose values rank top ω % as influential point regions, setting pixel values of the points to 1 and setting pixel values of other points to 0. The influential point image is expressed as Φg, and the residual images E is expressed as:

$$E = |z - \widehat{Z1}|,$$

where z and $\widehat{Z1}$ have the same meaning as above, and the tests showed that when ω is preferably 2 to 10.

(4) Excluding the influential point image Φg and the outlier image Φf from an original image pixel point set Φ to obtain a new pixel point set $\Phi_B$.

$\Phi_B = \Phi - \Phi g - \Phi.*\Phi f$, where .* represents a dot product operation, and $\Phi_B$ represents a pixel point set obtained by excluding the influential points and the outliers from the original image pixel point set Φ, and through fitting the pixel point set $\Phi_B$, the interference of the influential points and the outliers can be effectively eliminated, thereby improving the fitting precision.

Step S106: establishing a double-fourth-order polynomial surface fitting model, calculating coefficients of the double-fourth-order polynomial surface fitting model according to the new pixel point set, and estimating a background model according to the coefficients of the double-fourth-order polynomial surface fitting model, as shown in (d) of FIG. 2. The brightness change trend of the overall image can be approximately estimated by the polynomial fitting, and the success or failure of the fitting depends largely on the selection of the polynomial order. If the polynomial order is too low, the fitting effect is poor, and an obvious block effect may occur. If the polynomial order is too high, on the one hand, the time consumed increases geometrically, and on the other hand, an over-fitting phenomenon may easily occur. Considering various factors comprehensively, it is preferable that the highest order of the actual fitting polynomial is 4 or 5.

(1) Establishing a double-fourth-order polynomial surface fitting model $Z = X\beta + \varepsilon = p_{00} + p_{10}x + p_{01}y + p_{20}x^2 + p_{11}xy + p_{02}y^2 + p_{30}x^3 + p_{21}x^2y + p_{12}xy^2 + p_{03}y^3 + p_{40}x^4 + p_{31}x^3y + p_{22}x^2y^2 + p_{13}xy^3 + p_{04}y^4 + \varepsilon$;

wherein X and Z respectively represents a coordinate data set and a gray data set corresponding to the new pixel point set $\Phi_B$ in which the outliers and the influential points are excluded, and $p_{00}, p_{01}, \ldots, p_{40}$ represent the coefficients of the double-fourth-order polynomial surface fitting model.

(2) Calculating estimation values of coefficients of the double-fourth-order polynomial surface fitting model by using the least-squares method. The estimation values of the coefficients in the least squares sense are expressed as: $\hat{\beta} = (X^TX)^{-1}X^TZ$. There are fifteen coefficients in the fourth-order polynomial model and six coefficients in the second-order regression model, and they respectively correspond to different weights of the regression diagnose and the polynomial functions.

(3) According to the estimated coefficients $\hat{p}_{00} \sim \hat{p}_{04}$ of the double-fourth-order polynomial surface fitting model, a background image can be obtained:

$$\overline{Z} = X\hat{\beta} = \hat{p}_{00} + \hat{p}_{10}x + \hat{p}_{01}y + \hat{p}_{20}x^2 + \hat{p}_{11}xy + \hat{p}_{02}y^2 \hat{p}_{30}x^3 + \hat{p}_{21}x^2y + \hat{p}_{12}xy^2 + \hat{p}_{03}y^3 + \hat{p}_{40}x^4 + \hat{p}_{31}x^3y + \hat{p}_{22}x^2y^2 + \hat{p}_{13}xy^3 + \hat{p}_{04}y^4,$$

The background image $\overline{Z}$, which is finally fitted from the original image, reflects the basic brightness change trend of the overall image.

Step S107: image difference method. A residual image R is obtained by subtracting the background image fitted by the double-fourth-order polynomial surface fitting model from the original image Z. Since some pixel values after subtraction may be less than 0 (usually a position with a pixel value of greater than 0 indicates a bright Mura, and a position with a pixel value of less than 0 indicates a dark Mura), some information may be lost when direct rounding is performed on the pixel values. Therefore, a positive offset τ is added to the original residual image to normalize all pixels to a range greater than zero. By using the obtained residual image, the problem of uneven background brightness can be effectively solved, and the bright or dark Mura can be detected in one step without separately processing the bright or dark Mura. The difference image obtained in step S107 is shown in (e) of FIG. 2. $R = Z - \overline{Z} + \tau$.

Step S108: Niblack's threshold segmentation. An appropriate threshold value Thresh is selected, and repeated trials showed that the threshold value Thresh is preferably 0.6 to 3. A pixel gray value greater than the threshold value Thresh is set to 1, and a pixel gray value lower than the threshold value Thresh is set to 0.

The principle of the Niblack's threshold segmentation method is as follows: pixel dot product of the residual image R and the inversed binarized image is performed to obtain a residual RES=$(1-\Phi f).*R$, in which the outlier regions are excluded. The average value and the variance of the background region in the residual image are respectively calculated as follows:

$$u_\Phi = \frac{\sum RES}{\sum (1-\Phi f)} \text{ and } \sigma_\Phi = \frac{\sum (RES - u_\Phi)^2}{\sum (1-\Phi f)}.$$

Therefore, a threshold segmentation image T obtained by using the Niblack's threshold segmentation method can be expressed as:

$$T(u,v) = \begin{cases} 1 & |RES(u,v) - u_\Phi|/\sigma_\Phi > Thresh \\ 0 & |RES(u,v) - u_\Phi|/\sigma_\Phi \leq Thresh \end{cases},$$

wherein u and v represent coordinates of horizontal and vertical directions of an image, respectively.

Step S109: morphological processing. Erosion and then dilation is called an opening operation. The opening operation can eliminate the splashes and burrs, that is, smoothing the image. Dilation and then erosion is called a closing operation, by which the two adjacent parts can be connected in a case of selecting the appropriate element structure. In the binary image obtained after threshold segmentation, there are some small dots or lines, which are canine-shaped and hole-shaped, around or inside the defect boundary. Therefore, morphological processing is performed on the threshold segmentation image in the step S108, and the morphological processing specifically includes: performing erosion operation on the threshold segmentation image to remove small connected regions and then performing dilation operation on the image subjected to erosion operation to connect adjacent target regions. The resulting eroded and dilated image is shown in (f) of FIG. 2, and it can be seen from (f) of FIG. 2 that Mura defects with uneven brightness distribution can be effectively segmented by the method in the present disclosure.

Step S10: copying the resulting image subjected to morphological processing from the GPU to the CPU memory, performing texture unbinding, and releasing the GPU and CPU memories in time.

The method in the present disclosure was compared with the CPU serial implementation method, in which three test images of 2048×2048, 3560×4288 and 3240×5760 were processed by the CPU and the GPU, respectively, and processing times were recorded in Table 1.

TABLE 1 processing times of GPU and CPU

| Size of target image | Running time (s) | |
| --- | --- | --- |
| | CPU processing | GPU processing |
| 2048 × 2048 | 18 | 0.32 |
| 3560 × 4288 | 38 | 0.49 |
| 3240 × 5760 | 45 | 0.53 |

As can be seen from Table 1, the processing time required by the method of the present disclosure is greatly shortened compared to the conventional CPU method, and the GPU parallel implementation is 55-85 times faster than the CPU implementation. More importantly, the processing time required by the method of the present disclosure is less than 1 second at a resolution of 3560×4288, or even at an ultra-high resolution of 3240×5760, so that real-time processing can be achieved, regardless of whether the method of the present disclosure is used for on-line processing or off-line processing. This demonstrates the effectiveness of the GPU acceleration and the real-time processing performance in the method of the present disclosure.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A GPU-based TFT-LCD Mura defect detection method, comprising the steps of:
(1) establishing a studentized residual based double-second-order regression diagnosis model based original image data, calculating first coefficients of the double-second-order regression diagnosis model, and fitting the first coefficients to obtain double-second-order regression background data;

(2) obtaining influence quantities WK of respective data points on fitted values according to the original image data and the double-second-order regression background image data,
wherein an influence quantity of an ith data point $(z_i, x_i^T)$ on the fitted values is $$WK_i = \frac{z_i - \widehat{z1}(i)}{\hat{\sigma}(i)\sqrt{p_{ii}}} = \sqrt{\frac{(\hat{\beta}(i) - \hat{\beta})^T X^T X (\hat{\beta}(i) - \hat{\beta})}{\hat{\sigma}^2(i)}};$$

a data deletion model of the ith data points $(z_i, x_i^T)$ is expressed as $Z(i)=X(i)\beta+\varepsilon(i)$, where $X(i)$ represents a data set obtained by removing $x_i^T$ in an ith line from a coordinate data set X, $Z(i)$ represents a data set obtained by removing $z_i$ in the ith line from a gray data set Z, $z_i$ represents a gray value of the ith data point, and $x_i^T$ represents a coordinate vector of the ith data point; $p_{ii}$ represents a diagonal element of a projection matrix $P=X(X^TX)^{-1}X^T$ generated by X;

(3) excluding outliers and influential points in the original image data according to the influence quantities WK to obtain a new pixel point set $\Phi_B$;

(4) establishing a double-N-order polynomial surface fitting model according to the new pixel point set $\Phi_B$, calculating second coefficients of the double-N-order polynomial surface fitting model, and estimating double-N-order background image data $\overline{Z}$ according to the second coefficients;

(5) obtaining a residual image $R=Z-\overline{Z}+\tau$ according to the double-N-order background image data and the original image data, and performing threshold segmentation on the residual image to obtain a threshold segmentation image;

(6) performing morphological processing on the threshold segmentation image to obtain an eroded and dilated image, wherein the step (1) specifically comprises:
(1.1) establishing a studentized residual based double-second-order regression diagnosis model $Z=X\beta+\varepsilon=p_{00}+p_{10}x+p_{01}y+p_{20}x^2+p_{11}xy+p_{02}y^2+\varepsilon$;

(1.2) calculating estimation values $\hat{\beta}=(X^TX)^{-1}X^TZ$ of the first coefficients of the double-second-order regression diagnosis model by using a least square method;

(1.3) fitting the estimation values of the first coefficients to obtain a double-second-order regression background image data $\widehat{Z1}=X\hat{\beta}=X(X^TX)^{-1}X^T$, wherein X represents a matrix representation of a horizontal and a vertical axis coordinates of a two-dimensional image; Z represents a pixel gray value at a corresponding coordinate position in X; $p_{00}, p_{01}, \ldots, p_{20}$ represent the first coefficients of the double-second-order regression diagnosis model; $\varepsilon$ represents a residual value, which satisfies $\varepsilon \sim (0,\sigma^2 I)$, where I represents a unit matrix; $\beta$ a represents a vector representation of the first coefficients, and a confidence region of $\beta$ at a level of $1-\alpha$ is expressed as: $(\hat{\beta}-\beta)X^TX(\hat{\beta}-\beta)\leq p\hat{\sigma}^2 F(p,n-p,1-\alpha)$, where p represents a number of coefficients of the double-second-order regression diagnosis model; n represents a total number of image pixel points; $\hat{\beta}$ and $\beta$ respectively represent least square estimations of the first coefficients $\beta$ and a variance $\sigma$; and $F(p, n-p)$ represents an F distribution.

2. The TFT-LCD Mura defect detection method according to claim 1, further comprising, before the step (1.1), the step of: performing Gabor filtering on the original image data to remove a moiré and a texture grid in an original image captured by a charge coupled device, wherein the Gabor filtering operator includes:

$$g(x, y, f, \theta) = \frac{1}{ab}\exp\left[-\pi\left(\frac{x_r^2}{a^2} + \frac{y_r^2}{b^2}\right)\right]\left[\exp(i2\pi f x_r) - \exp\left(-\frac{\pi^2}{2}\right)\right];$$

$$x_r = x\cos\theta + y\sin\theta, \quad y_r = -x\sin\theta + y\cos\theta,$$

f represents a filtering frequency, and θ represents a filter direction; f is ½T, where T represents a width of a texture unit.

3. The TFT-LCD Mura defect detection method according to claim 2, wherein the filter directions θ are 0°, 45°, 90° and 135°, respectively.

4. The TFT-LCD Mura defect detection method according to claim 1, wherein the step (3) specifically comprises:
  (3.1) ranking the influence quantities WK from small to large, taking points whose WK rank top γ % as outlier regions, setting pixel values of the points to 1 and setting pixel values of other points to 0, thereby obtaining a binarized image $\Phi_{uv}$;
  (3.2) performing median filtering on the binarized image $\Phi_{uv}$ to obtain a filtered outlier image Φf;
  (3.3) ranking residual images E from large to small, taking points whose values rank top ω % as influential point regions, setting pixel values of the points to 1 and setting pixel values of other points to 0, thereby obtaining an influential point image Φg; and
  (3.4) excluding the influential point image Φg and the outlier image Φf from an original image pixel point set Φ to obtain a new pixel point set $\Phi_B$,
  wherein $$\Phi_{uv} = \begin{cases} 1, & WK_i < \gamma\ \% \\ 0, & WK_i \geq \gamma\ \% \end{cases},$$

and γ represents an outlier threshold, which has a value range of 0 to 100; the residual image is $E=|z-\widehat{Z1}|$, z and $\widehat{Z1}$ have the same meanings as above, and ω is 2 to 10; $\Phi_B=\Phi-\Phi g-\Phi.*\Phi f$, where .* represents a dot product operation, and $\Phi_B$ represents a pixel point set obtained by excluding the influential points and the outliers from the original image pixel point set Φ; the outlier refers to a point that is far away from overall data points and unable to be well explained by an established regression model; the influential point refers to a point which greatly changes the regression model.

5. The TFT-LCD Mura defect detection method according to claim 4, wherein in the step (5), the threshold segmentation specifically comprises:
  performing pixel dot product of the residual image R and an inversed binarized image to obtain a residual RES=(1−Φf).*R, in which the outlier regions are excluded; and
  obtaining a threshold segmentation image T(u, v) according to the residual RES as well as an average value $u_\Phi$ and a variance $\sigma_\Phi$ of a background region, u and v represent coordinates of horizontal and vertical directions of an image, respectively;

the threshold segmentation image s $$T(u, v) = \begin{cases} 1, & |RES(u, v) - u_\Phi|/\sigma_\Phi > Thresh \\ 0, & |RES(u, v) - u_\Phi|/\sigma_\Phi \leq Thresh \end{cases},$$

the average value of the background region is $$u_\Phi = \frac{\sum RES}{\sum(1-\Phi f)},$$

the variance of the background region is $$\sigma_\Phi = \frac{\sum(RES - u_\Phi)^2}{\sum(1-\Phi f)},$$

and the threshold value Thresh has a value range of 0.6 to 3.

6. The TFT-LCD Mura defect detection method according to claim 1, wherein N is 4 or 5; if N is 4, the step (4) specifically comprises:
  (4.1) establishing a double-fourth-order polynomial surface fitting model $Z=X\beta+\varepsilon=p_{00}+p_{10}x+p_{01}y+P_{20}x^2+p_{11}xy+p_{02}y^2+p_{30}x^3+p_{21}x^2y+p_{12}xy^2+p_{03}y^3+p_{40}x^4+p_{31}x^3y+p_{22}x^2y^2+p_{13}xy^3+p_{04}y^4+\varepsilon$;
  (4.2) calculating estimation values $\hat{\beta}=(X^TX)^{-1}X^TZ$ of second coefficients of the double-fourth-order polynomial surface fitting model by using the least-squares method; and
  (4.3) fitting the estimation values of the second coefficients to obtain a double-four-order background image data
  $\overline{Z}=X\hat{\beta}=\hat{p}_{00}+\hat{p}_{10}x+\hat{p}_{01}y+\hat{p}_{20}x^2+\hat{p}_{11}xy+\hat{p}_{02}y^2+\hat{p}_{30}x^3+\hat{p}_{21}x^2y+\hat{p}_{12}xy^2+\hat{p}_{03}y^3+\hat{p}_{40}x^4+\hat{p}_{31}x^3y+\hat{p}_{22}x^2y^2+\hat{p}_{13}xy^3+\hat{p}_{04}y^4$,
  wherein X and Z respectively represents a coordinate data set and a gray data set corresponding to the new pixel point set $\Phi_B$ in which the outliers and the influential points are excluded, $p_{00}, p_{01}, \ldots, p_{40}$ represent the coefficients of the double-fourth-order polynomial surface fitting model, and $\overline{Z}$ represents a background image finally fitted from the original image.

7. The TFT-LCD Mura defect detection method according to claim 1, wherein in the step (6), the morphological processing specifically comprises:
  performing an erosion operation to remove small connected regions in the threshold segmentation image, and then performing a dilation operation on the image subjected to the erosion operation to connect adjacent target regions, so as to obtain an eroded and dilated image.

8. The TFT-LCD Mura defect detection method according to claim 1, wherein the steps (1)-(6) are all implemented based on parallel processing of a graphics processing unit, the parallel processing comprising:
  allocating GPU memory and threads, binding CUDA arrays stored in the GPU memory to CUDA texture memory, allocating shared memories, starting kernel and performing GPU coarse-grained and fine-grained collaborative parallel computing to implement the steps (1)-(6), and passing calculating results back to the CPU from the GPU.

* * * * *